(12) United States Patent
Monserrat

(10) Patent No.: US 7,317,168 B1
(45) Date of Patent: Jan. 8, 2008

(54) INTERFACE MODULE FOR AUDIOVISUAL DEVICES

(76) Inventor: Ralph Monserrat, 1515 Ennis-Joslin Rd., Apt. 167, Corpus Christi, TX (US) 78412

( * ) Notice: Subject to any disclaimer, the term of this patent is extended or adjusted under 35 U.S.C. 154(b) by 0 days.

(21) Appl. No.: 11/079,588

(22) Filed: Mar. 14, 2005

Related U.S. Application Data

(60) Provisional application No. 60/552,698, filed on Mar. 12, 2004.

(51) Int. Cl.
*H01H 19/00* (2006.01)
(52) U.S. Cl. ........................................ 200/11 R; 439/49
(58) Field of Classification Search ............ 200/11 R, 200/13, 14, 17; 439/49, 52, 274, 275, 587, 439/589
See application file for complete search history.

(56) References Cited

U.S. PATENT DOCUMENTS

| | | | | |
|---|---|---|---|---|
| 4,052,573 A | * | 10/1977 | Kojima et al. | 200/11 DA |
| 5,010,214 A | * | 4/1991 | Yamazaki | 200/6 B |
| 5,221,962 A | * | 6/1993 | Backus et al. | 348/563 |
| 5,681,183 A | * | 10/1997 | Dzmura | 439/502 |
| 5,811,745 A | * | 9/1998 | Hung | 200/11 R |
| 6,213,815 B1 | * | 4/2001 | Wu | 439/638 |
| 6,481,013 B1 | * | 11/2002 | Dinwiddie et al. | 348/552 |

* cited by examiner

*Primary Examiner*—Elvin Enad
*Assistant Examiner*—M. Fishman
(74) *Attorney, Agent, or Firm*—Kenneth L. Tolar

(57) ABSTRACT

An interface module for interlinking a plurality of audio visual devices with a single video monitor includes a housing having an upper end with a plurality of sets of input jacks thereon, each set for coupling with a discrete audio visual device. An output cable extends from an opposing end of the housing that is connected to an input block on a video monitor. A switching mechanism establishes selective communication between the output cable and a select set of input jacks allowing a user to easily switch between multiple audiovisual devices without disconnecting or rerouting cables.

1 Claim, 1 Drawing Sheet

INTERFACE MODULE FOR AUDIOVISUAL DEVICES

CROSS REFERENCE TO RELATED APPLICATIONS

This application is entitled to the benefit of provisional application No. 60/552,698 filed on Mar. 12, 2004.

BACKGROUND OF THE INVENTION

The present invention relates to an interface module that allows a user to interlink a plurality of audiovisual devices with a single monitor.

DESCRIPTION OF THE PRIOR ART

Many audiovisual devices such as VCR'S, DVD players, camcorders and video game players must be coupled with an auxiliary monitor such as a television. However, many televisions or monitors only include a single set of auxiliary input jacks. Accordingly, if one regularly uses a plurality of such audiovisual devices, he or she must remove and reattach cables whenever switching from one audiovisual device to another. Because the input jacks are typically located on the rear surface of the monitor, such a task is laborious and burdensome.

The present invention satisfies this problem by providing an interface module to which a plurality of audiovisual devices can be connected. The module includes a single output that is connected to the auxiliary input jacks on a monitor. A switch allows a user to select a given audiovisual device output to be directed to the monitor.

SUMMARY OF THE INVENTION

The present invention relates to an interface module for audiovisual devices. The device comprises a housing having an upper end, a lower end and a front surface. On the upper end are multiple sets of input jacks, each set for receiving a cable plug from a discrete audiovisual device. Preferably, each set of jacks includes a video jack, an audio left channel jack and an audio right channel jack. Extending from the lower end of the housing is an output cable having three audiovisual plugs for connecting to the input block on a television or video monitor.

The output cable is in communication with a select one of the sets of jacks via a switching mechanism. The switching mechanism includes a rotatable dial on the upper surface of the housing. The dial is attached to a cylinder received within the housing having a plurality of contacts extending therefrom. Each contact is electrically connected to one of the plugs on the output cable. Each input jack on the upper end of the housing includes an electrical terminal extending inwardly into the housing interior. When the dial is rotated to align with a given set of input jacks, the contacts engage the corresponding input jack terminals to establish electrical communication between the output cable and the selected jacks. To direct the output of a different audiovisual device to the monitor, the dial is simply rotated to align with the set of jacks corresponding thereto.

It is therefore an object of the present invention to provide an interface module that allows a user to simultaneously couple a plurality of audiovisual devices with a single video monitor.

It is another object of the present invention to provide an interface module that allows a user to quickly and conveniently switch between a plurality of audiovisual devices without manipulating cables.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 2:
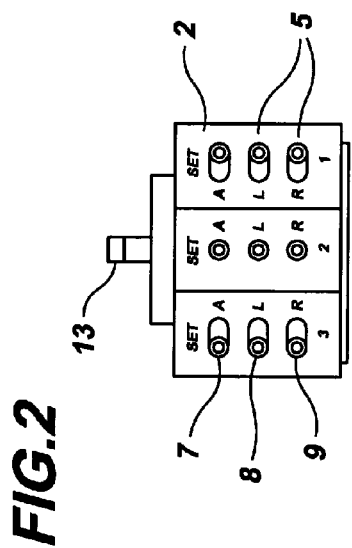
FIG. 2 depicts the upper end of the interface module.

Now referring specifically to FIGS. 1-4, the present invention relates to an interface module for audiovisual devices. The device comprises a housing 1 having an upper end 2, a lower end 3, a front surface 4 and a rear surface 25. A rubber, non-skid pad 26 is secured to the rear surface to frictionally engage an underlying support surface. On the upper end are multiple sets of input jacks 5, each set for receiving a cable plug 6 from a discrete audiovisual device. Preferably, each set of jacks includes a video jack 7, an audio left channel jack 8 and an audio right channel jack 9 all of which are color coded to identify each accordingly. Extending from the lower end of the housing is an output cable 10 having three audiovisual plugs 11 (i.e. video, audio left and audio right) for connecting to the input block 21 on a television or video monitor.

Figure 4:
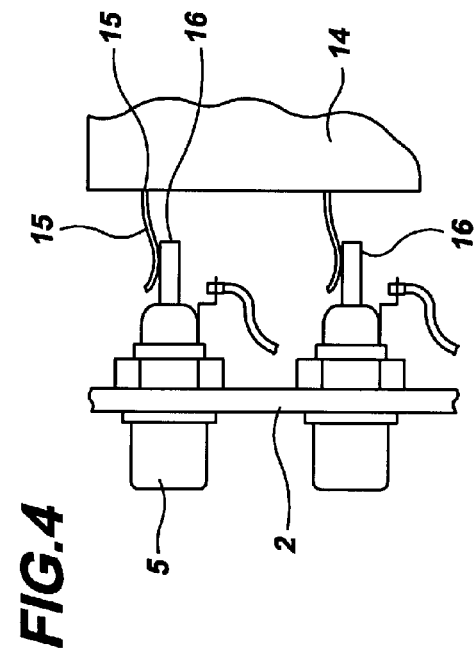
FIG. 4 is a detailed view of the internal switching mechanism.
Figure 1:
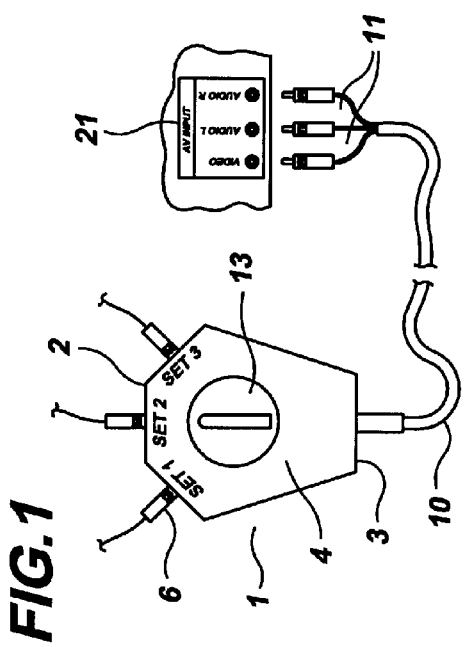
FIG. 1 is a top view of the interface module.
Figure 3:
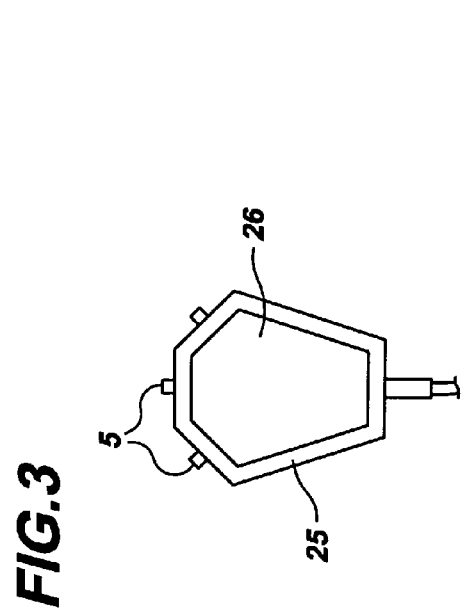
FIG. 3 is a rear view of the interface module.

The output cable is in communication with a select one of the sets of jacks via a switching mechanism. The switching mechanism includes a rotatable dial 13 on the upper surface of the housing. The dial is attached to a cylinder 14 received within the housing having a plurality of contacts 15 extending therefrom. Each contact is electrically connected to one of the plugs on the output cable. Each input jack on the upper end of the housing includes an electrical terminal 16 extending inwardly into the housing interior. When the dial is rotated to align with a given set of input jacks, the contacts engage the corresponding input jack terminals as depicted in FIG. 4 to establish electrical communication between the output cable and the selected set of jacks. To direct the output of a different audiovisual device to the monitor, the dial is simply rotated to align with the set of jacks corresponding thereto.

The present invention is not to be limited to the exact details of construction and arrangement of parts described above. Furthermore, the size, shape and materials of construction can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:
1. An interface module for audiovisual devices comprising:
   a housing having an upper end, a lower end and a front surface;

multiple sets of input jacks on the upper end of said housing, each set for receiving a cable plug from a discrete audiovisual device, each set of input jacks including a video input, an audio left channel input and an audio right channel input;

an output cable extending from the lower end of the housing for connecting to an input block on a video monitor, said output cable including a video output plug, an audio left channel output plug and an audio right channel output plug;

a switching means for establishing communication between a select one of said sets of input jacks and said output cable, said switching means including a rotatable dial on the upper surface of the housing; a cylinder received within the housing and connected to said dial, said cylinder having a plurality of contacts extending therefrom, each contact electrically connected to a discrete one of the plugs on the output cable; each input jack having an electrical terminal connected therewith, each terminal extending inwardly into the housing interior for selective engagement with one of said contacts whereby when the dial is rotated to align with a select set of input jacks, each contact engages an input jack terminal corresponding to the select set to establish electrical communication between the output cable and the select set of input jacks.

\* \* \* \* \*